US008812686B2

(12) United States Patent
Arnold (10) Patent No.: US 8,812,686 B2
(45) Date of Patent: Aug. 19, 2014

(54) COMMUNICATIONS SYSTEM AND METHOD (75) Inventor: Kieran Arnold, Buckinghamshire (GB)

(73) Assignee: Teoco Corporation, Fairfax, VA (US)

( * ) Notice: Subject to any disclaimer, the term of this patent is extended or adjusted under 35 U.S.C. 154(b) by 428 days.

(21) Appl. No.: 13/133,374

(22) PCT Filed: Nov. 19, 2009

(86) PCT No.: PCT/GB2009/051573
§ 371 (c)(1),
(2), (4) Date: Aug. 22, 2011

(87) PCT Pub. No.: WO2010/067090
PCT Pub. Date: Jun. 17, 2010

(65) Prior Publication Data
US 2011/0296031 A1    Dec. 1, 2011

(30) Foreign Application Priority Data

Dec. 9, 2008  (GB) .................................. 0822430.5

(51) Int. Cl.
*G06F 15/16* (2006.01)
*G06F 15/173* (2006.01)
(52) U.S. Cl.
USPC ........................... 709/227; 709/232; 709/240
(58) Field of Classification Search
None
See application file for complete search history.

(56) References Cited

U.S. PATENT DOCUMENTS

| 6,963,578 | B2 * | 11/2005 | Akahane et al. ............. 370/417 |
| 8,014,381 | B2 * | 9/2011 | Kumai et al. ................ 370/351 |
| 8,229,468 | B1 * | 7/2012 | Robinson ................... 455/456.2 |
| 2005/0041576 | A1 * | 2/2005 | Couturier et al. ............. 370/229 |
| 2007/0206613 | A1 | 9/2007 | Silver et al. |
| 2008/0267088 | A1 | 10/2008 | Dunbar et al. |

FOREIGN PATENT DOCUMENTS

| EP | 1732268 A1 | 12/2006 |
| WO | 02/073883 A2 | 9/2002 |
| WO | 03/030429 A2 | 4/2003 |
| WO | 2008096013 A2 | 8/2008 |
| WO | 2008155621 A2 | 12/2008 |

* cited by examiner

*Primary Examiner* — John B. Walsh
(74) *Attorney, Agent, or Firm* — ATFirm PLLC; Ralph P. Albrecht (57) ABSTRACT

A communication system is arranged to provide a communication service to a communication terminal. The communication system comprises a packet data network arranged to communicate data packets supporting the communication service to and from the communication terminal via a data path through the packet data network, a path computational element arranged to control the data path, an application server arranged to control the communication service and an internet multimedia sub-system operable to control the application server. The application server is operable to provide the communication service to the communication terminal in response to a registration request transmitted from the communication terminal to the internet protocol multimedia subsystem requesting an establishment of the communication service. When establishing the communication service, the internet protocol multimedia sub-system is operable to communicate an adaptation message to the path computational element including information indicating service quality parameters associated with the communication service. The path computational element is operable to calculate the data path in accordance with the service quality parameters and to adapt the packet data network in accordance with the calculated data path.

15 Claims, 7 Drawing Sheets

COMMUNICATIONS SYSTEM AND METHOD

FIELD OF THE INVENTION

The present invention relates to communications systems and methods operable to provide a communication session for supporting a service to a user over a packet data network terminal.

BACKGROUND OF THE INVENTION

In the field of modern communications, it is well known to provide various communication services to a user via a packet data network. Consider the example of a computer terminal accessing a web page hosted on a remote server. When a user of the computer terminal wishes to access the web page, a request is sent across the packet data network to the remote server which responds by sending packet data back to the computer terminal corresponding to the requested web page. Other examples include "real-time" services such as voice communications. Voice communications may be undertaken for example by a communications terminal using an internet protocol (VoIP) application. The terminal is typically connected to the packet data network and voice data is communicated to and from the terminal by the transmission of packets across the network. Often, a VoIP server will support the VoIP application, acting as a gateway to other networks (for example conventional land line networks) where a correspondent terminal is located with which the communication terminal is communicating. Additionally, if the correspondent terminal is another VoIP terminal in the same packet data network, the VoIP server may provide general control plane functions.

Another example communication service is media data streaming from a media server to a terminal across a packet data network. In this example a terminal may request access to media data such as video data, stored on the media server. In response the media server "streams" media data to the terminal across the packet data network by communicating a stream of successive packets to the terminal. Typically, the terminal will only store a fraction of the total media being streamed (for example in a buffer), decoding and reproducing most of the media in real-time.

Other communications systems are provided which enable devices to move around within a network whilst still accessing services and applications provided by a remote host. An example of such a system provides a packet data network including an internet protocol multimedia sub-system (IMS). Mobile nodes can roam within the packet data network, for example connecting to the network at various wireless connection points, whilst accessing services and applications provided by the IMS.

Although users of communications terminals may enjoy multimedia communication services provided by an IMS, these services require that a packet data network, which provides communication of packet data along the data path, is able to provide a sufficient quality of service to support the multimedia communication services.

SUMMARY OF THE INVENTION

According to an aspect of the present invention there is provided a communication system operable to provide a communication service to a communication terminal. The communication system comprises a packet data network arranged to communicate data packets supporting the communication service to and from the communication terminal via a data path through the packet data network, a path computational element arranged to control the data path, an application server arranged to control the communication service and an internet multimedia sub-system operable to control the application server. The application server is operable to provide the communication service to the communication terminal in response to a registration request transmitted from the communication terminal to the internet protocol multimedia sub-system requesting an establishment of the communication service. When establishing the communication service, the internet protocol multimedia sub-system is operable to communicate an adaptation message to the path computational element including information indicating service quality parameters associated with the communication service. The path computational element is operable to calculate the data path in accordance with the service quality parameters and to adapt the packet data network in accordance with the calculated data path.

A data path via which data is communicated across a packet data network can be defined by a device such as a path computational element (PCE). However, in a conventional packet data network including a PCE, there is no means of adapting the data path to take account of the nature of the data which is being transmitted and specifically the type of communication service which is generating the data. This presents a technical problem because different types of communication services that might be provided to a communication terminal may have different service quality requirements depending on the nature of the communication service. Embodiments of the present invention provide a communication system in which the data path via which packet data is transmitted to and from a communication terminal in a packet data network can be adapted in accordance with service quality parameters associated with the type of communication service which is generating the packet data. The service quality parameters may for example include packet delay, minimum or maximum bandwidth, timing and jitter. The packet data network can be adapted to meet the requirements of a particular communication service. For example, should a certain communication service perform poorly with a reduced bandwidth, then the PCE can choose a data path in the packet data network which provides an increased bandwidth. Alternatively, a different communication service may perform better with a data path providing a reduced latency. Accordingly, the PCE can determine and form a data path with a reduced latency. This might include optimising a route of the data packets via nodes within the network.

According to a further embodiment of the invention, the PCE is operable to determine whether a suitable data path is available to support the communication service. If there is no suitable path the PCE transmits a reject message to the internet protocol multimedia sub-system indicating there is no suitable data path, available in the packet data network which provides the service quality parameters indicated in the adaptation message.

This embodiment provides a facility which enables the PCE to prevent the establishment of a communication service to a communication terminal when the quality of service parameters that may be required to satisfactorily support that communication service are not available in the packet data network.

According to another embodiment the adaptation message includes information indicating a priority of the communication terminal. The PCE is operable to adapt the packet data network in accordance with the calculated path network only if the priority of the communication terminal is above a threshold priority level. According to this embodiment, the PCE is able to exert control over whether or not an adaptation request from a particular user should result in the packet data network being adapted. Such an embodiment can allow the implementation of a user profile based preferential quality of service.

According to another embodiment, the adaptation message is provided within a session initiation protocol subscribe message. In accordance with this embodiment, the adaptation message is in the form of a modified message of an existing type. This may minimise any alteration required to existing network hardware and software components when implementing embodiments of the invention.

Various further aspects and features of the invention are defined in the appended claims which include a method of communicating via a packet data network and a computer program.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF EXAMPLE EMBODIMENTS

Figure 1:
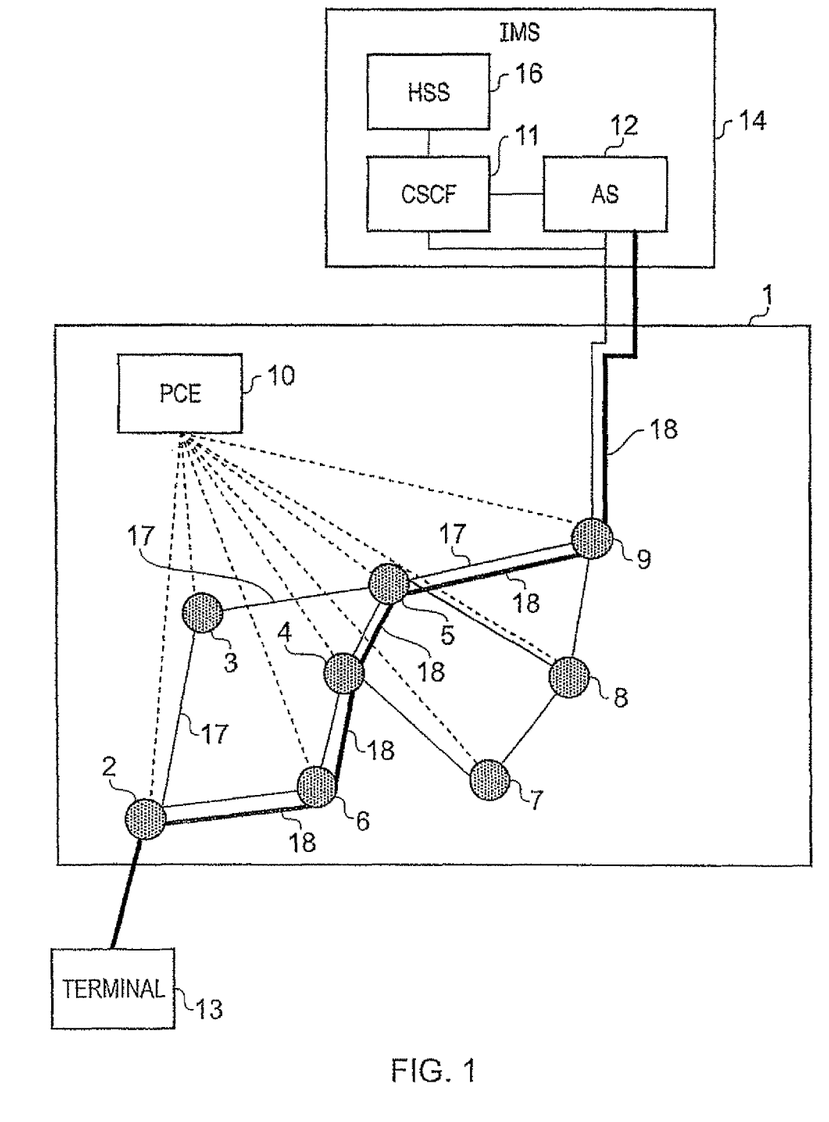
FIG. 1 provides a schematic diagram showing a conventional communication system.

FIG. 1 provides a schematic diagram of a conventional communication system which can provide communication services to a communication terminal. The communication terminal may be a mobile device such as a portable personal computer or a portable telephone. The system includes a packet data network 1 which comprises a number of network nodes 2, 3, 4, 5, 6, 7, 8, 9 and a path computational element 10. The network nodes typically comprise network elements such as routers and switches which direct data packets across the packet data network 1. The network nodes are controlled by a path computational element (PCE) 10. The PCE 10 is a module within the packet data network which can control the nodes to determine how and by which route (data paths) packet data is transmitted across the network. The PCE computes the data paths based on information which describes different characteristics of the packet data network such as bandwidth constraints, quality of service capability, load balancing requirements and so on. As illustrated by the broken lines connecting the network nodes 2, 3, 4, 5, 6, 7, 8, 9 to the PCE 10, the PCE 10 can control each node to effect change in the routing of packet data and thus form the data paths. In one example, the functionality and architecture of the PCE is in accordance with the Internet Engineering Task Force (IETF) Request for Comments (RFC) 4655.

The system shown in FIG. 1 also includes an internet protocol multimedia sub-system (IMS) 14. The IMS 14 includes call session control functions 11 (CSCF) and an application server 12. The application server 12 provides communication services to devices attached to the packet data network 1. Although the application server 12 in FIG. 1 is shown within the IMS 14, it will be understood that this is merely illustrative and the application server 12 can be arranged so as to be physically remote from the IMS 14. Furthermore, although the IMS 14 shown in FIG. 1 only illustrates one application server 12, it will be understood that the IMS 14 is able to support a number of application servers. A communication terminal 13, for example a mobile device on which an application can be run, can access communication services provided by the application server 12 via the packet data network 1. Examples of communication services provided by the application server 12 can include media streaming services, voice over IP (VoIP) services, interactive gaming and so on.

In the case of VoIP communication services, the communication terminal 13 may engage in a VoIP communication session with a corresponding terminal, whereby the session is initiated and controlled by the application server 12. However, packet data containing actual voice data may be transmitted directly between the communication terminal and the correspondent terminal.

As will be understood, in order to access the communication services provided by the application server 12, packet data will be communicated to and from the communication terminal 13 through the packet data network 1. The example shown in FIG. 1 illustrates a simple communication service provided by the application server 12 in which packet data is simply communicated from the application server 12 to the communication terminal 13. Examples of such communication services include media streaming such as video streaming services.

In accordance with the operation of the PCE 10 described above, a route (i.e. a data path) taken by the packet data can be defined by the PCE 10. For example, in FIG. 1 thin lines 17 connecting the network nodes illustrate interconnections between the nodes. These interconnections provide a number of different potential data paths via which packet data can be communicated to and from the application server 12 and the communication terminal 13. However, thick lines 18 illustrate an actual data path taken by packet data communicated to and from the communication terminal 13 and the application server 12 through the communication network as designated by the PCE 10.

In order for the communication terminal 13 to gain access to the services provided by the application server 12, the communication terminal 13 first sends a session initiation protocol (SIP) registration request to the IMS 14. Upon receiving this request, the CSCF 11 undertakes various authentication and validation processes and accesses a user profile from a home subscriber database 16 (HSS). For the sake of brevity, these procedures shall not be explained in any depth. However, further detail can be found in 3GPP Technical Specification 23.218.

Figure 2:
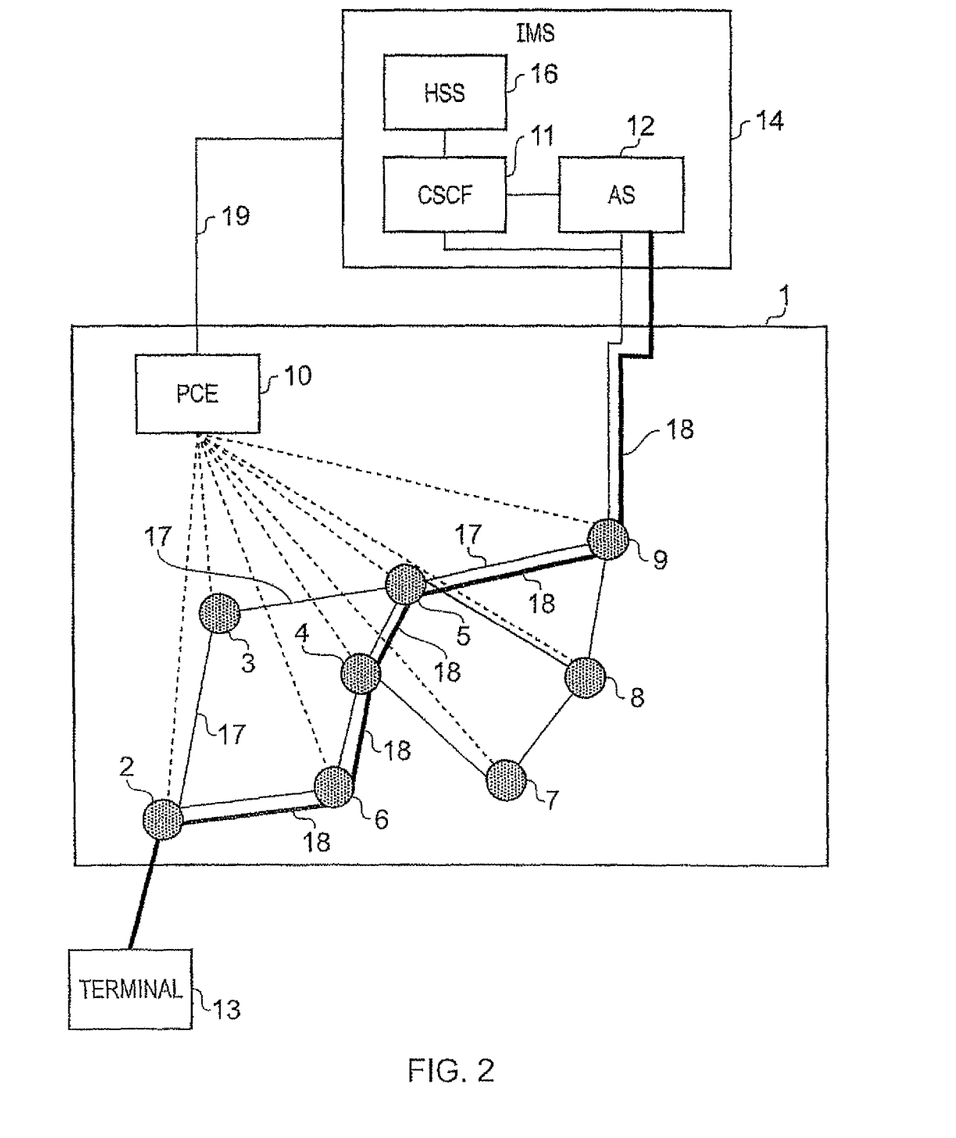
FIG. 2 provides a schematic diagram showing a communication system arranged in accordance with an embodiment of the invention.

FIG. 2 provides a schematic diagram of a communication system arranged in accordance with an embodiment of the present invention.

As can be seen from FIG. 2, a communication interface 19 is provided which connects the IMS 14 and the PCE 10. By providing the communication interface 19, interaction between the IMS 14 and the PCE 10 becomes possible. In one example, the IMS 14 and the PCE 10 can be arranged to co-ordinate the data path by which packet data is communicated in response to a request by the communication terminal 13. This can provide a number of advantages. For example, a data path designated by the PCE 10 can be adapted in accordance with any particular requirements of the communication service which the communication terminal 13 is attempting to use. For example, if a communication terminal 13 requests a communication service from an application server providing a "real-time" service such as voice over IP which requires packets to be transmitted from user to server as quickly as possible, then the PCE 10 could be arranged to designate a data path that minimises latency and packet loss. In another example, if the communication terminal wishes to access an application which requires a large amount of data to be communicated such as downloading or streaming media data such as video or audio data, the PCE 10 could be arranged to designate a data path that provides a bandwidth sufficient to ensure that it does not take an undesirably long period of time for the audio or video data to be communicated from the application server to the communication terminal.

Figure 3:
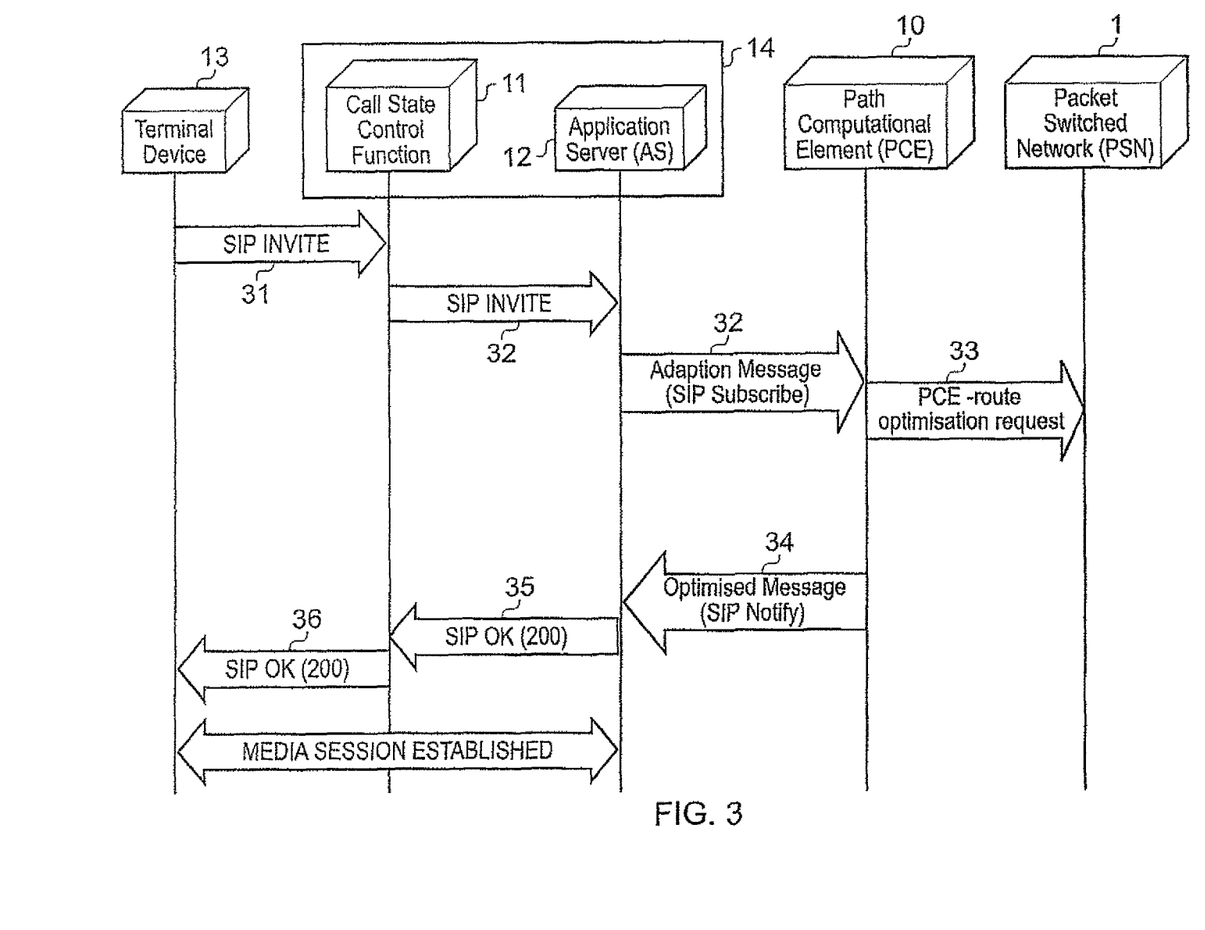
FIG. 3 provides a schematic diagram illustrating a flow of messages between a communication terminal and an internet protocol multimedia sub-system.

FIG. 3 shows a flow of messages between the communication terminal 13, the IMS 14 and the PCE 10 which enables the data path to be calculated by the PCE 10 taking into account requirements of a communication service provided by the application server. As explained above, in order for the communication terminal 13 to access a communication service provided by the application server 12, the communication terminal 13 initiate a communicate request in the form of a SIP INVITE request 31 to the CSCF 11, the CSCF 11 forwards the INVITE request 32 to the application server 12. In response to the INVITE 32, the application server 13 is operable to respond with an adaptation message 33 transmitted to the PCE 10. The adaptation message may contain information indicating the type of communication service provided by the application server along with other parameters such as quality of service requirements and so on. In order to minimise any alteration required to existing network hardware and software components, the adaptation message 33 may be in the form of a modified message of an existing type such as a SIP subscribe message. After receiving the adaptation message 33 from the application server 12, the PCE 10 is operable to determine if a routing adaptation of the network 1 is necessary, and if so to calculate and implement an appropriate updated data path. The updated data path will typically be calculated by the PCE 10 executing a routing algorithm. The routing algorithm will include various parameters and variables, some of which are defined in accordance with information provided in the adaptation message. Examples of such variables may includes parameters specifying minimum bandwidth levels, and tolerances for latency, packet loss and jitter. Once the updated data path has been calculated, the PCE 10 adapts the network accordingly. This is illustrated in FIG. 3 by the transmission of a path optimise instruction 34 from the PCE 10 to the network 1. As will be appreciated with reference to FIGS. 1 and 2 showing the broken lines connecting the network nodes 2, 3, 4, 5, 6, 7, 8, 9 to the PCE 10, each node comprising the network 1 can be controlled to effect change in the routing of packet data.

Once the path optimise instruction 34 has been issued by the PCE 10, a notify optimised message 35 is communicated from the PCE 10 to the application server 12, corresponding acknowledgment messages 35 and message 36 are then generated by the application server 12 and forwarded via CSCF 11 to the communication terminal 13.

Figure 4:
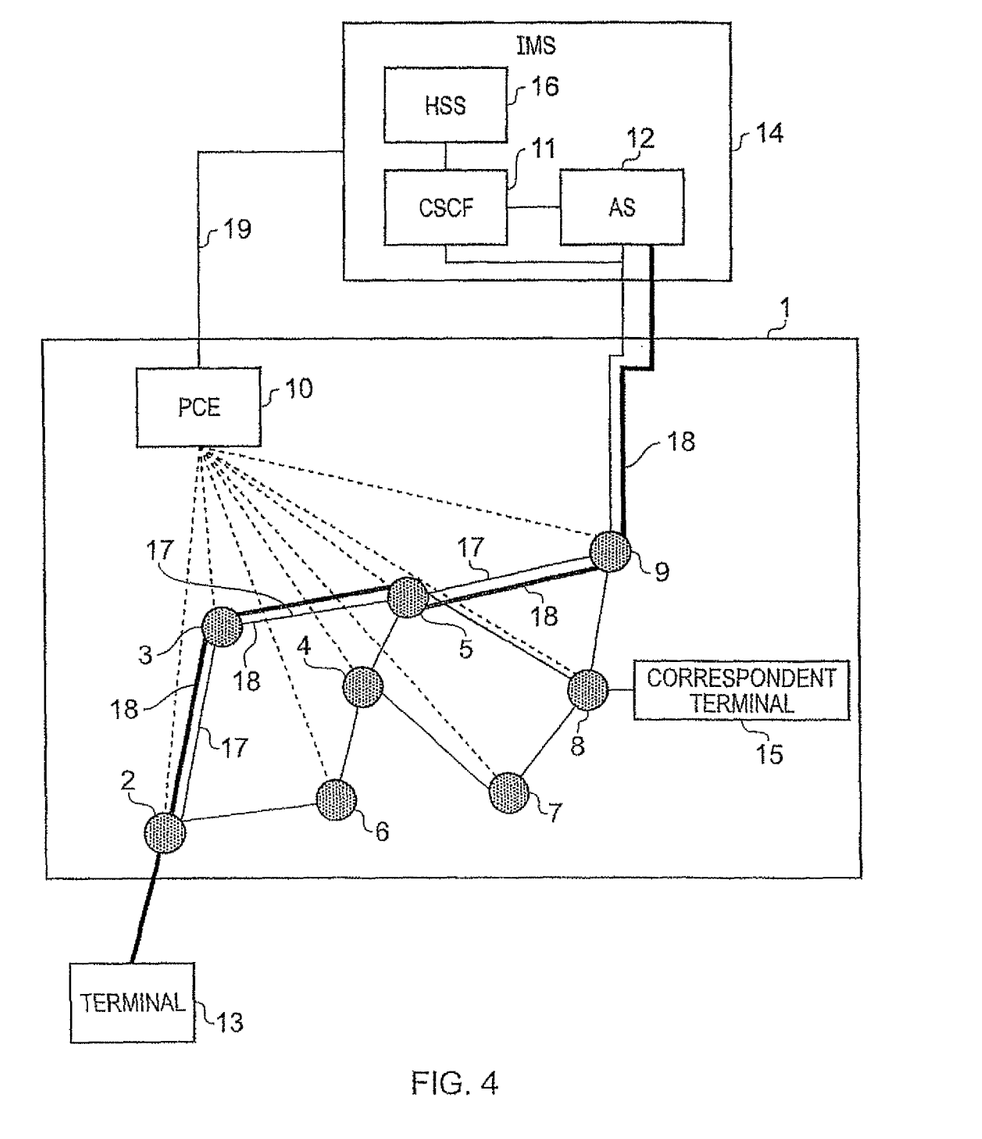
FIG. 4 provides a schematic diagram showing a communication system arranged in accordance with an embodiment of the invention.

FIG. 4 shows an example of the communication system of FIG. 2 in which the data path 18 of the transmitted packet data has been adapted in accordance with the present invention. In this example, the communication terminal 13 might be a mobile device including a media player application which can reproduce media data, such as audio and video data, streamed to it from a remote server such as the application server 12. In this example the application server 12 is a media streaming server. The communication terminal 13 may be connected to the packet data network 1 via a wireless link such as a WiFi link or via a conventional mobile access network such as a 3GPP radio access network.

In order for the communication terminal 13 to receive audio and video data streamed from the application server 12, a registration request, for example an INVITE request must be sent to the IMS 14. Prior to the communication terminal 13 attempting to initiate the communication service with the application server 12, the communication network 1 may be configured as illustrated in FIG. 2.

In the packet data network 1 illustrated in FIG. 2, packets communicated between the application server 12 and the communication terminal 13 are routed in accordance with the data path illustrated by the thick line 18. As shown in FIG. 2, the data path between a first node 2 and the destination node 9 includes four legs. A first leg is formed between the interconnection between the first node 2 and a second node 6, a second leg is formed between the second node 6 and a third node 4 and so on. As described above, the data path 18 illustrated in FIG. 2 is controlled by the PCE 10.

In this example, when a user of the communication terminal 13 wishes to stream media data from the application server 12 to the communication terminal, the communication terminal 13, the CSCF 11 and the application server 12 exchange messages as described above and as shown in FIG. 3. The exchange of messages includes the communication of the adaptation message 33 from the application server 12. The adaptation message communicated from the application server 12 includes parameters specifying quality of service requirements for the streaming of media data from the application server 12 to the communication terminal 13. As mentioned above, the requirements may specify that an optimised path for media streaming requires that the network nodes and interconnections between network nodes which make up the data path be characterised by a bandwidth sufficient to ensure that it does not take an undesirably long period of time for the media data to be communicated from the application server 12 to the communication terminal 13. As will be understood, a data path with a low bandwidth may be particularly problematic for applications which decode and reproduce streamed media data in real time. This is because the application may decode and reproduce the media data more quickly than it can be communicated from the application server 12 to the communication terminal 13. The result of this is a discontinuous and interrupted reproduction of the media data which users may find particularly unsatisfactory. As a corollary of this, providing a data path with minimised latency or packet loss might only be a secondary priority because the media player application may include error correction functionality which can tolerate an amount of packet loss/latency without noticeably affecting the quality of the reproduced video and audio.

Accordingly, when the adaptation message 33 reaches the PCE 10, the PCE 10 calculates a new data path through the communication network which prioritises bandwidth. FIG. 4 illustrates the re-calculated data path. As can be seen with reference to FIG. 4, the first, second and third leg have been changed such that the data path taken between the first node 2 and the fourth node 5 is now only composed of two legs between the first node 2, a second node 3 and the fourth node 5. In this example, the rearranged first and second legs between the first node 2, second node 9 and third node 16 may exhibit a higher bandwidth than the first, second and third leg shown in FIG. 2. Thus, the data path has been adapted in accordance with the communication terminal's request for access to an application provided by the application server 12.

As will be appreciated, the PCE 10 is also capable of calculating optimised data paths between the communication terminal 13 and other nodes on the packet data network 1. In another example illustrated in FIG. 5, the communication terminal 13 may be a mobile device including a VoIP application which can facilitate an IP voice session with a correspondent terminal 15 which is also be attached to the packet data network 1. As in the previous example, the communication terminal 13 may be connected to the packet data network 1 via a wireless link such as a WiFi link or via a conventional mobile access network such as a 3GPP radio access network. As explained above, the VoIP session is initiated and controlled by the application server 12, which in this example a VoIP application server. However, packet data containing actual voice data may be transmitted directly between the communication terminal 13 and the correspondent terminal 15.

Figure 5:
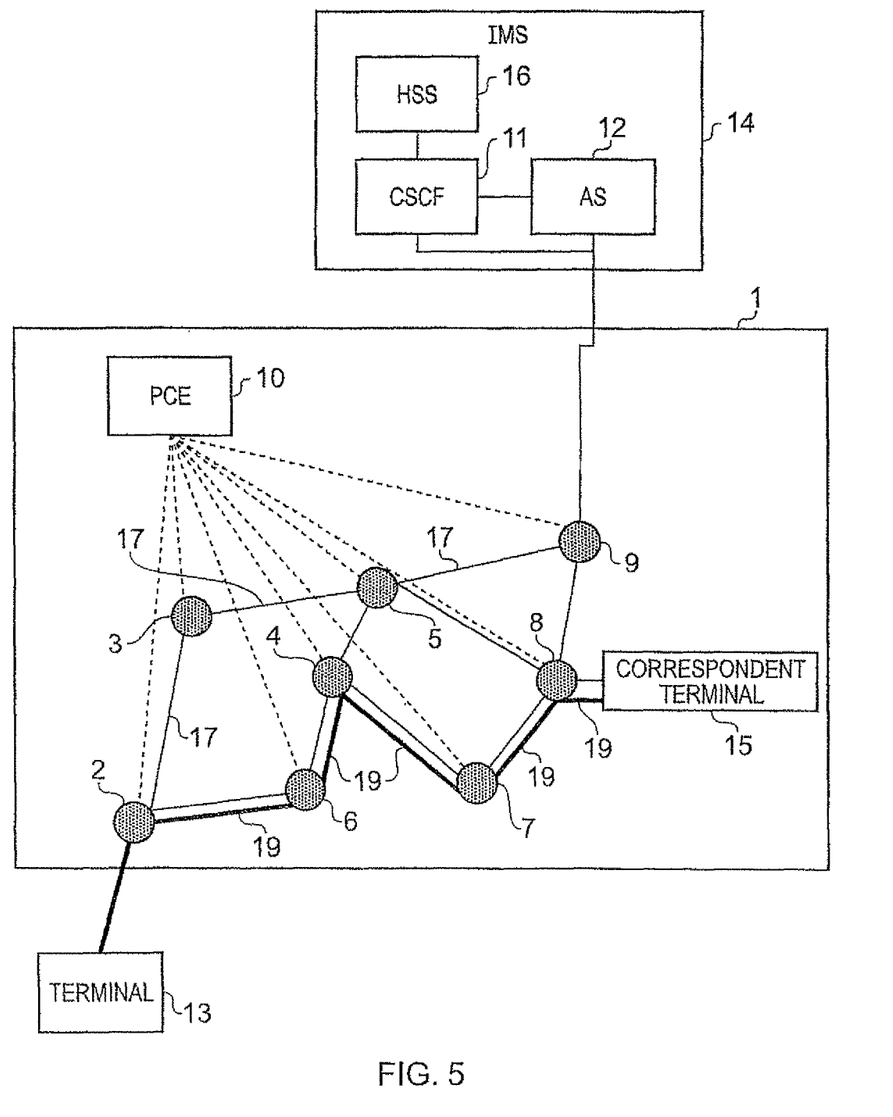
FIG. 5 provides a schematic diagram showing a communication system arranged in accordance with an embodiment of the invention.

In order for the communication terminal 13 to initiate an IP voice call with the correspondent terminal 15, the communication terminal 13 sends, for example, a SIP invite message to the correspondent terminal 15 via the IMS 14. The SIP invite message is received by the application server 12 which initiates a session with the application server 12. Therefore, when a user of the mobile device wishes to initiate the IP voice call, the VoIP client running on the communication terminal 13, the CSCF 11 and the application server 12 exchange messages as described above and as shown in FIG. 3. The exchange of messages includes the communication of the adaptation message 33 from the application server 12. The adaptation message from the application server 12 includes parameters specifying quality of service requirements for a data path 19 between the communication terminal 13 and the correspondent terminal 15. As mentioned above, these requirements may specify that an optimised path for a VoIP session requires the network node and interconnections between network nodes to be characterised by a minimal latency and packet loss. Accordingly as shown in FIG. 5, when the adaptation message 33 reaches the PCE 10, the PCE 10 calculates a data path 19 through the communication network between the communication terminal 13 and the correspondent terminal 15. In this example, the data path 19 between the first node 2, second node 6, third node 4, fourth node 7 and fifth node 8 provides nodes and interconnections between nodes which are characterised by a reduced latency and packet loss.

Figure 6:
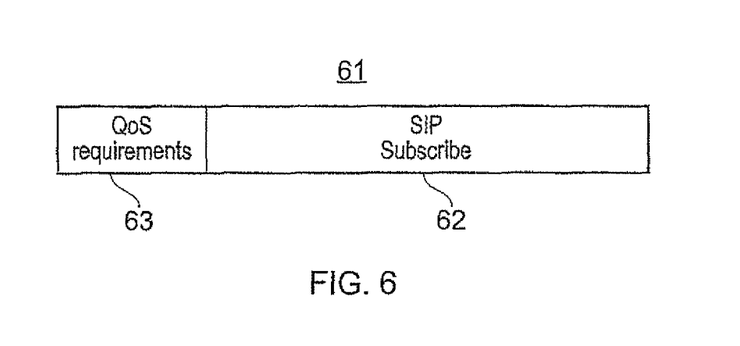
FIG. 6 provides a schematic diagram illustrating a session initiation protocol subscribe message including an adaptation message.

As mentioned above, the adaptation message 33 may be in the form of a modified message of an existing type such as a SIP subscribe message. FIG. 6 shows a diagram which illustrates the format of an example of a combined adaptation/SIP subscribe message 61 which is communicated from the application server 12 to the PCE 10. The combined adaptation/SIP subscribe message 61 may include a first part 62 which corresponds to the format of a conventional SIP subscribe message and a second part 63 which contains information such as the type of application provided by the application server along with other parameters such as quality of service requirements of the application provided by the application server. It will be understood that the combined adaptation/SIP subscribe message 61 shown in FIG. 6 merely illustrates the concept of combining an adaptation message with a SIP subscribe message. For example, although the adaptation message part 63 is simply appended to the SIP subscribe message part 62 in the example shown in FIG. 6, other arrangements are contemplated such as integrating the adaptation message part 63 within the SIP subscribe message part 62 or distributing sections of the adaptation message part 63 throughout the SIP subscribe message part 62.

Although the invention has so far been described mainly in terms of adapting the data path calculated by the PCE 10 in accordance with information provided in an adaptation message, additional interaction between the IMS 14 and the PCE 13 is envisaged. As is known, a PCE 10 is typically provided with information describing the network which it controls. This information may include "fixed" parameters which are unchanging or change rarely such as the topology of the network, maximum bandwidth capacity of various links and so on. The information may also include "dynamic" parameters which change frequently such as the quantity of data being transmitted across a particular link, or information indicating the temporary unavailability or reduced capacity of a particular link. Both the fixed and dynamic information may be used to determine whether, irrespective of any adaptation of the network by the PCE, the current conditions within the network are good enough to support a particular application. For example, if an application provided by an application server requires a very high bandwidth, there may not be enough high bandwidth links available to form a suitable data path. In some cases therefore, upon receipt of the adaptation message 33, the PCE 10 may be operable to compare service quality requirements specified in the adaptation message with the available service quality that the network can provide. If the service quality requirements specified within the adaptation message 33 cannot be met or a suitable data path cannot be provided, the PCE 10 may be operable to communicate this back to the IMS 14 which may then take appropriate action. This action might include, rejecting the original request to set up the communication session between the application server and the communication terminal. The IMS may also transmit a suitable error message to be forwarded to the communication terminal and the application server.

Alternatively, the PCE may be used to perform a policy control function. For example the adaptation message may include an indication of the level of priority that should be afforded to the communication terminal that generated the original registration request. This information may be provided by a user profile provided by the home subscriber server of the IMS. For example, if the adaptation message indicates a first communication terminal is to be afforded a high priority, the data path might be adapted to favour data transmitted for the application used by the first communication terminal. In contrast an adaptation message transmitted in respect of a second communication terminal with a lower priority may not be acted on by the PCE. Alternatively or additionally, the PCE may be operable to adapt the packet data network only if the priority of the communication terminal is above a threshold priority level.

Figure 7:
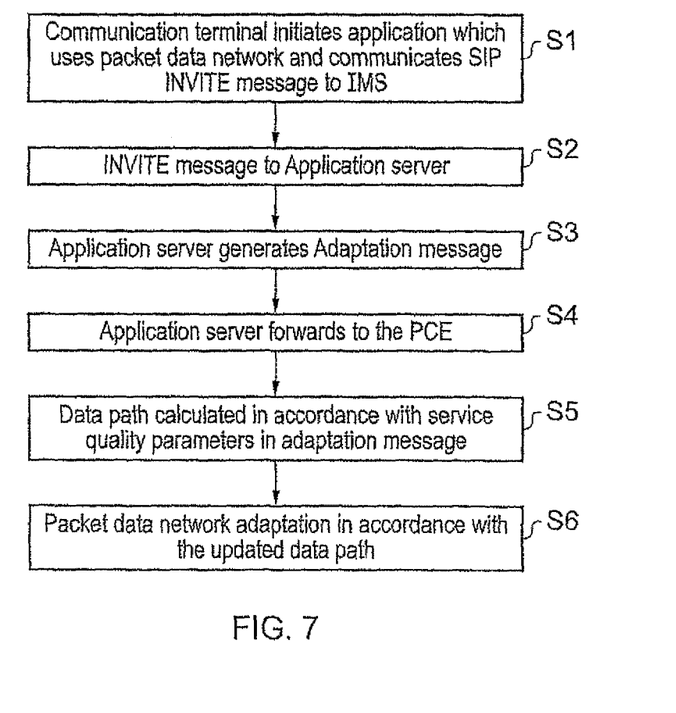
FIG. 7 shows a flow chart illustrating a method of providing a communication session between a communication terminal and an application server according to an embodiment of the present invention.

FIG. 7 shows a flow chart illustrating a method of providing a communication session between a communication terminal and an application server according to an embodiment of the present invention. As explained above, the communication session is provided by a communication of data packets between the communication terminal and the application server via the data path through the packet data network. The data path is determined by the PCE, the application server being controlled by the IMS and the communication session being established in response to an INVITE registration request transmitted from the communication terminal to the IMS.

At step S1 the communication terminal 13 imitates an application which uses the packet data network 1; at step S2 the communication terminal communicates an INVITE request to the IMS 14; at step S3 the INVITE request is forwarded to the application server 12; at step S4 the adaptation message is forwarded to the PCE 10; at step S5, the PCE calculates an updated data path in accordance with the service quality parameters, and at step S6 the PCE adapts the packet data network in accordance with the updated data path.

It will be appreciated that in embodiments of the present invention, elements of the invention may be implemented in any suitable manner. Thus the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

The invention claimed is:

1. A communication system operable to provide a communication service to a communication terminal, the communication system comprising:
 a packet data network arranged to communicate data packets supporting the communication service to and from the communication terminal via a data path through the packet data network,
 a path computational element arranged to control the data path,
 an application server arranged to control the communication service, and
 an internet multimedia sub-system operable to control the application server, the application server being operable to provide the communication service to the communication terminal in response to a registration request transmitted from the communication terminal to the internet protocol multimedia sub-system requesting an establishment of the communication service,
 wherein when establishing the communication service, the internet protocol multimedia sub-system is operable to communicate an adaptation message to the path computational element including information indicating service quality parameters associated with the communication service, and
 the path computational element is operable to calculate the data path in accordance with the service quality parameters and to adapt the packet data network in accordance with the calculated data path, and wherein the adaptation message includes information indicating a priority of the communication terminal, and
 the path computational element is operable to adapt the packet data network if the priority of the communication terminal is above a threshold priority level.

2. A communication system according to claim 1, wherein the path computational element is operable to determine whether a suitable data path providing the service quality parameters indicated in the adaptation message is available to support the communication service, and if there is no suitable path, to transmit a reject message to the internet protocol multimedia sub-system indicating there is no suitable data path available in the packet data network.

3. A communication system according to claim 2, wherein upon receipt of the reject message, the internet protocol multimedia sub-system is operable to reject the registration request from the communication terminal,
 wherein the adaptation message includes information indicating a priority of the communication terminal, and
 the path computational element is operable to adapt the packet data network if the priority of the communication terminal is above a threshold priority level.

4. A communication system according to claim 1 wherein the adaptation message is provided within a session initiation protocol subscribe message.

5. A method of providing a communication service to a communication terminal, the communication service being supported by a communication of data packets to and from the communication terminal via a data path through a packet data network, the data path being determined by a path computational element, the communication service being controlled by an application server, the application server being controlled by an internet protocol multimedia sub-system, the method comprising:
 communicating a registration request from the communication terminal to the internet protocol multimedia sub-system requesting an establishment of the communication service,
 communicating an adaptation message from internet protocol multimedia subsystem to the path computational element including information indicating service quality parameters associated with the communication service,
 calculating the data path in accordance with the service quality parameters,
 adapting the packet data network in accordance with the calculated data path, wherein the adaptation message includes information indicating a priority of the communication terminal, and
 adapting the packet data network if the priority of the communication terminal is above a threshold priority level.

6. A method according to claim 5, comprising
 determining whether a suitable data path providing the service quality parameters indicated in the adaptation message is available to support the communication service, and if there is no suitable path;
 transmitting a reject message to the internet protocol multimedia sub-system indicating that there is no suitable data path available in the packet data network.

7. A method according to claim 6, comprising rejecting an invite registration request from the communication terminal upon receipt of the reject message,
 wherein the adaptation message includes information indicating a priority of the communication terminal, the method comprising
 adapting the packet data network if the priority of the communication terminal is above a threshold priority level.

8. A method according to claim 5, wherein the adaptation message is provided within a session initiation protocol subscribe message.

9. A path computational element comprising:
 one or more features operable to:
  determine a data path through a packet data network via which data packets are communicated to and from a communication service thereby providing a communication service, the communication service being controlled by an application server, the application server being controlled by an internet protocol multimedia sub-system, the communication service being provided to a communication terminal in response to a registration request transmitted from the communication terminal to the internet protocol multimedia sub-system requesting an establishment of the communication service, upon receipt of an adaptation message communicated from the internet protocol multimedia sub-system including information indicating service quality parameters associated with the requested communication session, calculate the data path in accordance with the service quality parameters and adapt the packet data network in accordance with the calculated data path, and wherein the adaptation message includes information indicating a priority of the communication terminal, and adapt the packet data network if the priority of the communication terminal is above a threshold priority level.

10. A Session Initiation Protocol subscribe message arranged to include an adaptation message including information indicating service quality parameters associated with a communication service provided to a communication terminal in a communication system according to claim 1.

11. A Session Initiation Protocol subscribe message as claimed in claim 10, wherein the adaptation message includes an indication of a priority of the communication terminal.

12. A communication system comprising:
- a path computational element operable to determine a data path via which packet data is communicated through a packet data network to a communication terminal in accordance with at least one service quality parameters; and
- an internet protocol multimedia sub-system operable to provide communication services to the communication terminal coupled to the packet data network, wherein the path computational element and the internet protocol multimedia sub-system are arranged to exchange data with each other via a communication interface by an adaptation message comprising the at least one service quality parameter of the communication services provided, and the adaptation message operable to indicate priority of the communication terminal;
- wherein the communication services provided are operable to be controlled by an application server, the application server operable to be controlled by said internet protocol multimedia sub-system;
- wherein the communication system is operable to adapt the packet data network based on the determined path; and
- wherein the communication system is operable to adapt the packet data network if the priority is above a threshold priority level.

13. A computer program having computer executable instructions, which when loaded on to a network of computing device causes the network of computing devices to perform the method according to claim 5.

14. A computer program product having a non-transitory computer readable medium having recorded thereon computer program logic operable to provide the communication system operations claim 12, when executed on at least one computer processor.

15. An apparatus for providing a communication service to a communication terminal, the communication service being supported by a communication of data packets to and from the communication terminal via a data path through a packet data network, the data path being determined by a path computational element, the communication service being controlled by an application server, the application server being controlled by an internet protocol multimedia sub-system, the apparatus comprising:
- the communication terminal configured to communicate a registration request to the internet protocol multimedia sub-system requesting an establishment of the communication service,
- the internet protocol multimedia sub-system configured to communicate an adaptation message to the path computational element including information indicating service quality parameters associated with the communication service, the adaptation message including information indicating a priority of the communication terminal, and
- a path computational element configured to calculate the data path in accordance with the service quality parameters, to adapt the packet data network in accordance with the calculated data path, and to adapt the packet data network if the priority of the communication terminal is above a threshold level.

* * * * *